(12) United States Patent
Eis et al.

(10) Patent No.: US 7,854,150 B2
(45) Date of Patent: Dec. 21, 2010

(54) DEVICE AND METHOD FOR DRAWING OPTICAL FIBERS

(75) Inventors: Wolfgang Eis, Niedernhausen (DE); Lothar Willmes, Hallgarten (DE)

(73) Assignee: Schott AG, Mainz (DE)

( * ) Notice: Subject to any disclaimer, the term of this patent is extended or adjusted under 35 U.S.C. 154(b) by 1127 days.

(21) Appl. No.: 10/770,616

(22) Filed: Feb. 2, 2004

(65) Prior Publication Data

US 2005/0066688 A1  Mar. 31, 2005

Related U.S. Application Data

(60) Provisional application No. 60/506,083, filed on Sep. 25, 2003.

(51) Int. Cl.
 *C03B 37/07* (2006.01)
(52) U.S. Cl. .......................... 65/486; 65/381
(58) Field of Classification Search ............ 65/381, 65/486
 See application file for complete search history.

(56) References Cited

U.S. PATENT DOCUMENTS

| | | | | |
|---|---|---|---|---|
| 2,622,810 A | * | 12/1952 | Stream et al. | 242/474.9 |
| 3,650,717 A | * | 3/1972 | Canfield | 65/486 |
| 3,847,579 A | * | 11/1974 | Fulk et al. | 65/381 |
| 4,130,248 A | * | 12/1978 | Hendrix et al. | 242/472.8 |
| 2003/0079501 A1 | | 5/2003 | Lee | |
| 2005/0126227 A1 | * | 6/2005 | Collaro | 65/378 |

* cited by examiner

*Primary Examiner*—Queenie Dehghan
(74) *Attorney, Agent, or Firm*—Laurence A Greenberg; Werner H Stemer; Ralph E Locher

(57) ABSTRACT

A device for making up a plurality of synchronously produced individual optical fibers includes a drawing installation for drawing the fibers and a take-up winder for winding up the fibers on a take-up spool. The drawing installation provides an identical and constant drawing rate for each of the fibers. The take-up winder has a compensating device to compensate for differences in speed of the fibers between the drawing installation and the take-up spool. Fluctuations of the fiber diameter during production of the fibers are avoided and the fibers are passed at a substantially constant rate to the take-up winder. A fiber bundle can be made up without influencing the drawing rate, thereby also avoiding reactions on the melting process when drawing the fibers from a heated preform. A method for making up a plurality of synchronously produced individual optical fibers is also provided.

2 Claims, 1 Drawing Sheet

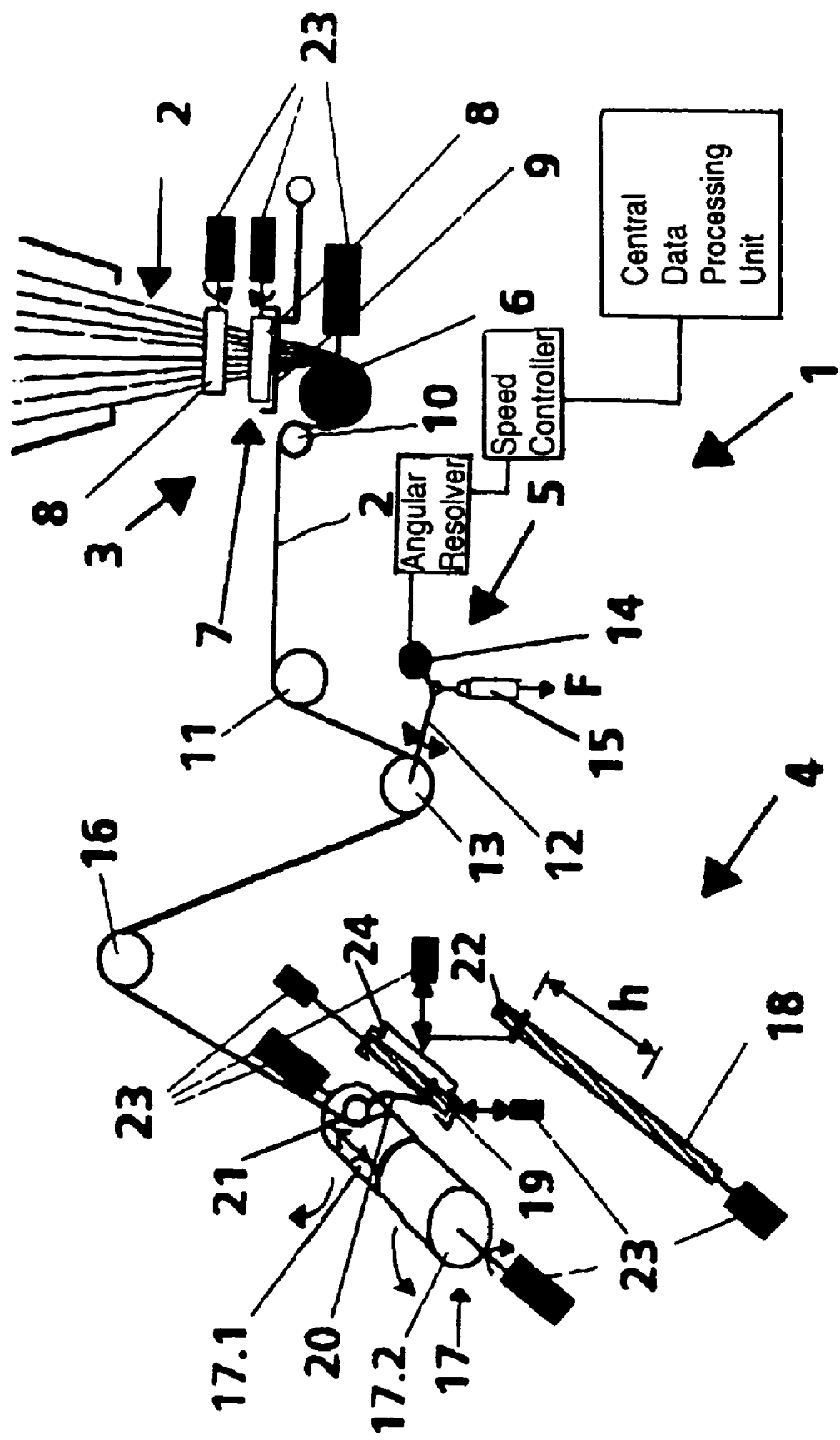

DEVICE AND METHOD FOR DRAWING OPTICAL FIBERS

CROSS-REFERENCE TO RELATED APPLICATION

This application claims the benefit under 35 U.S.C. §119(e) of U.S. Provisional Application No. 60/506,083, filed Sep. 25, 2003.

BACKGROUND OF THE INVENTION

Field of the Invention

The invention relates to a device and a method for making up a plurality of synchronously produced individual optical fibers, in particular multicomponent optical fibers. The invention relates in particular to a multifiber drawing machine having a drawing installation and a take-up winder for winding up the fibers on a take-up spool.

Conventional multifiber drawing installations for producing optical fibers operate such that optical fibers are melted from preforms in a draw furnace. The optical fibers are then passed, via a drawing installation, to a take-up winder that winds the fibers onto a take-up spool. Conventional production methods differ from one another with respect to the type and quality of the optical fibers to be produced, or the rate of fiber production and the number of optical fibers to be produced simultaneously.

The preforms include at least a rod of a specific glass material with a given diameter. For the use of multicomponent optical fibers in optical fiber bundles, however, it is necessary that the optical fibers have a certain quality with regard to the diameter of each optical fiber or the diameter variance of a number of optical fibers produced simultaneously, wherein it is necessary to have an optimum reflectivity for the light conducted through the optical fiber. These properties are achieved in the case of multicomponent optical fibers by multi-layered preforms, which include a core rod and, for example, a cladding tube. The optical fibers drawn from this have a core and a cladding connected thereto. In this case, the high reflection properties are produced by the cladding, which has a specific refractive index. The core rod is formed of a material with a higher refractive index than the cladding material, in order to ensure the light-conducting properties and the optical properties.

When melting the preform, the dripping of the first glass drop has the effect that the cladding material is drawn over the core material and the two materials unite.

To keep the material thicknesses constant and to create optimal optical properties of the different materials in the optical fibers, it is necessary that the diameters of the optical fibers are kept constant. In addition, the temperature profiles in the fiber furnace are of critical importance for the optical and mechanical properties of the multicomponent optical fibers that are produced.

Published U.S. Patent Application No. 2003/0079501 A1 discloses a multiple drawing installation for optical fibers which are drawn from single-layer preforms. These preforms are generally formed of quartz glass, which is melted at 2000° C. in a draw furnace. From the draw furnace, a fiber is drawn off, its diameter is checked or measured with regard to accuracy by a corresponding device in a draw tower and it is subsequently coated with a polymer material. After that, the optical fiber is wound up on a take-up spool. The optical fibers produced in this way from quartz glass are usually used in telecommunications technology or for data transmission. Because of the increased requirements on the accuracy of the diameter and because of the consequently necessitated testing measures, they are always drawn individually and also individually post-processed after the draw furnace. The improvements which were recognized by Published U.S. Patent Application No. 2003/0079501 A1 when compared with a conventional production of individual fibers are that a number of autonomously operating devices for producing individual fibers can be connected in parallel, in order to allow a corresponding number of optical fibers to be produced simultaneously.

This type of production is unsuitable for the creation of multicomponent optical fibers, since in optical systems including multicomponent optical fibers it is possible to use a plurality of optical fibers in optical fiber bundles which have to satisfy different requirements with regard to the accuracy of the diameter and the coating. It has been found that cost-effective production of such optical fiber bundles with individual fiber drawing devices is not possible even if a number of them are connected in parallel.

In particular, it has been found as a disadvantage of such devices that, in spite of the parallel connection of a number of individual fiber drawing installations, the number of optical fibers is limited considerably below what is necessary. The post-processing relating to the individual fiber also entails considerable costs, so that the creation of fiber bundles for optical systems from multicomponent optical fibers would be uneconomical.

In comparison with the optical fibers used for data transmission, the concern in the case of optical fiber bundles including multicomponent optical fibers is less for the quality of the individual fibers than for the quality of the complete optical fiber bundle. In addition, unlike in the case of data transmission fibers, considerations of cost-effectiveness play a significantly greater role for the use of optical fiber bundles including multicomponent optical fibers.

Conventional drawing installations in which a plurality of optical fibers are drawn and post-processed as fiber bundles may be used for this purpose. Each optical fiber is in this case drawn from a preform. In order to obtain the desired number of optical fibers, a corresponding number of preforms are synchronously melted.

The preforms are in this case made up of a core rod and a cladding tube with different glass materials, each material having a specific composition, in order to ensure the desired optical properties of the multicomponent optical fibers drawn from them. Each preform usually includes in this case a core rod and at least one cladding tube. For the melting operation, the core rod is arranged in the cladding tube and they are fastened together on a corresponding suspension. The suspensions with the individual preforms are fastened in a corresponding number next to one another on a supporting plate and can be introduced in this way into the heating bushes of a draw furnace. Each preform is in this case assigned to a heating bush or heating tube. The heating bushes in the draw furnace and the suspensions of the preforms on the supporting plate are arranged in a corresponding way in this case.

In order to allow the preforms to be introduced into the draw furnace and melted in accordance with the principles of the mass flow law, the supporting plate is equipped with a suitable follow-up device or tracking device, which permits a predetermined synchronous advancement of all the preforms. Furthermore, the draw furnace or the heating bushes have corresponding devices for temperature control, so that the optical fibers can be drawn from the preforms under the same melting conditions.

In order to ensure in an adequate way the optical requirements imposed on the glass material of the optical fibers and the physical properties of the fiber bundles created with them, adequate processing accuracy during the melting and drawing operation must be ensured, wherein it is necessary in particular to avoid fluctuations of the temperature and of the drawing rate on the individual fibers and consequently fluctuations in the diameter of the fibers. In this respect, according to the mass flow law, the mass of the molten glass material and the mass of the glass material drawn off as optical fiber should be constant.

Furthermore, the number of fibers per fiber bundle is to remain the same; therefore, looping and breakage of individual fibers during drawing and assembling are to be avoided. In addition, it may be expedient for all the fibers to be uniformly provided with size. Finally, during assembly it must be ensured that the fiber bundle is wound up on the take-up spool in such a way that it can be unwound again from the take-up spool without any problem during the further processing, without any damage occurring to the fiber bundles or the individual fibers.

In order that the production of the fiber bundles can be performed cost-effectively, it must be ensured that a plurality of fibers can be processed simultaneously.

It has been found that, when guiding the fibers individually, as described above, with subsequent testing and coating, the aforementioned requirements for cost-effectiveness cannot be ensured.

SUMMARY OF THE INVENTION

It is accordingly an object of the invention to provide a method and a device for making up a plurality of optical fibers which overcome the above-mentioned disadvantages of the heretofore-known methods and devices of this general type and with which it is possible for fiber bundles to be produced and made up from a plurality of individual fibers with little effort and at low cost while maintaining the aforementioned quality requirements, wherein a synchronous, uniform processing of the individual fibers drawn simultaneously from the draw furnace and a direct continuous making-up of the fiber bundles produced from them is ensured and defect-free further processing of the made-up fiber bundles is made possible.

With the foregoing and other objects in view there is provided, in accordance with the invention, a device for making up a plurality of optical fibers, including:

a multifiber drawing machine having a drawing installation and a take-up winder;

the drawing installation being configured to synchronously produce a plurality of individual optical fibers, and the drawing installation being configured to provide a drawing rate for drawing the plurality of individual optical fibers such that the drawing rate is substantially constant and substantially identical for each of the optical fibers;

the take-up winder having a take-up spool and a compensating device;

the take-up spool taking up the optical fibers; and the compensating device being configured such that, when the optical fibers have respective different speeds at the drawing installation and at the take-up spool, the compensating device compensates for differences in speed between the drawing installation and the take-up spool.

In other words, according to the invention, there is provided, a device for making up or assembling a plurality of synchronously produced individual optical fibers, in particular multicomponent glass fibers, from a multifiber drawing installation, with a drawing installation and a take-up winder for winding up the fibers on a take-up spool, wherein the drawing installation has a device for producing an identical, constant drawing rate of the fibers and wherein the take-up winder has a compensating device to compensate for differences in speed of the fibers between the drawing installation and the take-up spool.

The device for producing an identical, constant drawing rate of the individual fibers achieves the effect that each individual fiber is produced under the same conditions. In particular, the effect is achieved that fluctuations of the fiber diameter during production of a fiber are avoided. The fluctuations can consequently be kept advantageously in a tolerance range of below 1 µm. Identical drawing rates of all the fibers allow differences between the individual fibers to be kept small or to be avoided virtually completely.

The compensating device achieves the effect that the fibers passed at a substantially constant rate from the drawing installation to the take-up winder can be further processed continuously.

The speed of the drawing installation has great influence on the fiber quality and must therefore be kept constant. According to the invention, the speed of the take-up winder is therefore controlled through the use of the compensating device in accordance with the speed of the drawing installation. This achieves the advantageous effect that the fiber bundle can be wound up without any reaction on the drawing rate, thereby also avoiding reactions on the melting process.

In the drawing installation, the individual fibers run through a sizing bath and are uniformly coated with a sizing agent. It is also provided according to the invention that the fibers can be brought together in the drawing installation to form a fiber bundle. This achieves the advantageous effect that the fibers are bundled with the still moist sizing composition and dry as fiber bundles. Consequently, the fiber bundle can be handled better during further processing, since the individual fibers adhere to one another as a result of the sizing composition.

For making up the fiber bundle, it is proposed by the invention that the take-up winder has a fiber guiding unit and that the fiber bundle can be continuously displaced on the take-up spool through the use of the fiber guiding unit. It is consequently possible in an advantageous way to wind up the finished fiber bundle in an ordered or oriented manner on the take-up spool. This avoids any instances of damage to the fiber bundle that could arise as a result of disorderly windings. Furthermore, the effect is achieved that the take-up spool can be unwound again without any problem, so that defects during the further processing, for example cladding the fiber bundle in plastic, can be avoided.

For this purpose, it is provided that the fiber guiding unit has at least one controllable excursion mechanism, which acts on a fiber guide with a guiding roller for laying the fibers over the take-up spool.

According to another feature of the invention, the take-up winder has a layer-compensating device or position-compensating device for adapting the fiber guiding unit to the changing wound-up radius and/or for shortening the winding width of the layers of fiber on the take-up spool. It is consequently possible to wind the fiber bundle onto the take-up spool with a precision winding.

The fiber bundle is in this case wound layer by layer onto the take-up spool, it being possible to take into account the changing of the distance of the guiding roller from the last layer in each case. This makes it possible for the individual layers of the fiber bundles to be laid on the take-up spool under the same conditions. It is also possible, however, for the winding width of the layers to be reduced by a predetermined amount symmetrically on both sides, whereby it can be ensured that the winding is stabilized in the lateral end positions. As a result, increased securement at the edges of the layers on the take-up spool is achieved and uniform unwinding of the fiber bundle during further processing is ensured. Furthermore, any damage which could arise on fallen-off windings during transport and during the storage of the full take-up spools is avoided.

Finally, the layer-compensating device also achieves the advantageous effect that the winding of each layer can be performed with constant firmness.

This is achieved by the layer-compensating device having at least one controllable excursion mechanism, with which the traveling displacement of the fiber guide and/or the guiding roller is controllable in dependence on the number of fiber layers on the take-up spool parallel and/or radially in relation to the axis of rotation of the take-up spool.

It is provided in this case that the respective number of layers is determined through the use of a control unit and that the excursion mechanism, preferably a reverse-thread shaft, is correspondingly set, in order to achieve a shortening of the excursion to reduce the winding width. In this case, the traveling displacement of the fiber guide is changed parallel to the axis of rotation of the take-up spool.

It is also provided that a further excursion mechanism is acted on by the control unit in a way corresponding to the number of layers, in order to displace the fiber guide or the guiding roller radially in relation to the axis of rotation of the take-up spool in dependence on the number of layers, in order to maintain a substantially constant distance of the guiding roller from the uppermost layer of the take-up spool and consequently achieve continuously high precision during the winding-up.

It is provided according to the invention that the compensating device has a device for compensating for the change in speed of the fiber bundle when changing layers and/or on account of the changing wound-up radius of different layers on the take-up spool. When changing layers at the respective turning points of the longitudinal excursion, the so-called laying advancement no longer exists. By shortening the excursion and at the same time compensating for the changing of the take-up rate, loosening of the winding at the turning points is consequently avoided.

Furthermore, the drawing rate of the fiber bundle would increase continuously on account of the steadily increasing winding radius during winding-up. This must be avoided. The take-up rate is kept constant by the compensating device according to the invention, in that the rotational speed of the take-up spool is correspondingly adapted.

For this purpose, it is provided that the device for compensating for the change in speed has a dancing arm, on which a deflection roller for guiding the fiber bundle is rotatably fastened and is held on the dancing arm pivotably about the mounting point of the dancing arm on one side parallel to a plane of rotation of the take-up spool.

For suitable guidance of the fiber bundle, it is also provided that the deflection roller and the take-up spool have axes of rotation that are substantially parallel to each other.

Furthermore, the compensation for the changes in speed is achieved by the deflection roller being held on the dancing arm in such a way that it can oscillate about the mounting point in relation to the pivoting movement. The guidance of the fiber bundle provided in this way makes it possible to compensate for prolonged changes in speed by the pivoting movement, while the oscillating capability of the deflection roller in relation to the pivoting movement described above makes it possible in a way according to the invention to compensate for brief changes in speed.

During the winding-up, the fiber bundle is displaced over the take-up spool, that is to say moved back and forth in the direction of the longitudinal axis of the take-up spool. One layer is consequently applied over the others on the take-up spool. At the turning points, the advancement of the fiber guide is correspondingly changed from one direction into the other direction, that is to say that the take-up rate of the fiber bundle temporarily drops on account of the changed rate of advancement at the turning points and then increases again. The change in speed takes place very quickly. In this case, it is required for precise winding that the fiber bundle remains tightly guided during the extremely short turning operation of the fiber guide. The dancing arm takes up these short changes in speed by the oscillating capability of the deflection roller. In this case, to compensate for the change in speed, the deflection roller is moved out of a position of equilibrium briefly and without the dancing arm as a whole being pivoted about the mounting point, and it can quickly return again into the position of equilibrium after the turning point.

For this purpose, it is advantageously provided that, to ensure a predetermined oscillating capability of the deflection roller fastened to it, the dancing arm is produced from elastic material with a predetermined modulus of elasticity, preferably from plastic. As an alternative to this, it is provided that, to ensure a predetermined oscillating capability of the deflection roller fastened to it, the dancing arm has a predetermined material thickness and/or form of material.

To make it possible to compensate for the differences in speed in spite of the return of the dancing arm, it is proposed according to the invention that the dancing arm has at the mounting point an associated angular resolver, through the use of which data on angles of rotation can be transmitted to a speed controller for controlling the take-up rate of the take-up spool. It is consequently possible to compensate systematically for differences in speed of the take-up winder during the winding-up by' changing the rotational speed. This takes place in an advantageous way through the use of the angular resolver, which senses the extent to which the dancing arm is pivoted for compensation, and the rotational speed of the take-up spool is changed accordingly. By changing the rotational speed of the take-up spool, the dancing arm is returned automatically into the position of equilibrium through the use of a compensating force. The dancing arm is consequently always kept in equilibrium about the position of equilibrium.

Both compensating possibilities have the effect that the deflecting displacement of the fiber bundle in the fiber guide during the deflection or the pivoting of the deflection roller is shortened or lengthened, so that the fiber bundle is laid with a corresponding take-up rate on the take-up spool.

In order that values can be systematically prescribed not only for shortening the excursion but also for measures to compensate for the differences in speed and for the winding-up, it is proposed according to the invention that the compensating device for compensating for differences in speed and/or the layer-compensating device for adapting the fiber guiding unit can be controlled through the use of a central data processing unit.

It is also provided according to the invention that the dancing arm can be set in a position of equilibrium during the drawing and winding-up operation through the use of a force, preferably provided by a pneumatic or hydraulic cylinder. The position of equilibrium of the dancing arm is in this case fixed by the forces which act on the dancing arm on one side from the cylinder and on the other side from the fiber bundle. This achieves the effect that the dancing arm sets itself at a predetermined angle with respect to the fiber bundle during the drawing operation.

It is also provided that, in the event of an undesired fiber breakage or at the end of the fiber creation, for example if the glass material of the preforms is used up, the taking-up operation is discontinued. For this purpose, it is proposed according to the invention that, if there is an interruption or abnormal termination of the drawing and taking-up operation, the dancing arm can be made to travel into a neutral position through the use of a force, preferably provided by a pneumatic or hydraulic cylinder.

In the neutral position, according to the invention the take-up winder is then stopped. The dancing arm is also in the neutral position when the device is being set up, until the fiber bundle is fastened on the take-up spool. Subsequently, the process is started and the dancing arm is moved out of the neutral position, so that the speed controller according to the invention is set to the drawing rate. It is of advantage in this case that all the fibers can be taken up simultaneously when the device is being set up.

It is also provided that a tension can be set in the fiber bundle through the use of the dancing arm, preferably through the use of an adjustable pneumatic or hydraulic cylinder. The dancing arm is in this case acted on, through the use of the pneumatic or hydraulic cylinder, with an adjustable force, by which the tension for winding up the fiber bundle is produced in the fiber bundle. This tension permits firm, orderly winding.

In an advantageous way, it is possible in this case for all the measures described above to be realized by the same pneumatic or hydraulic cylinder.

Since the drawing process must not be interrupted, it is necessary that the making-up through the use of the take-up spool is performed continuously. The winding-up process must therefore be continued uninterruptedly when the spool is changed. For this purpose, it is proposed according to the invention that the take-up spool is fastened in an exchangeable manner.

As soon as the desired maximum winding length is reached on the take-up spool, a spool change is performed such that, for the exchange of the take-up spool, a replacement spool can be placed next to the take-up spool in the direction of the spool axis and that the fiber guiding unit can be made to travel over the replacement spool or the replacement spool can be made to travel under the fiber guiding unit for the further laying of the fiber bundle.

It is in this case provided that, when changing the fiber bundle from the full take-up spool by using the compensating device, the rotational speed of the replacement spool can be controlled by closed-loop and/or open-loop control via the central data processing unit. This achieves the effect that it is possible to compensate on the one hand for the traveling speed of the fiber guiding unit and on the other hand for the changing of the wound-up radius between the full take-up spool and the empty replacement spool.

The completed wound-up spool can consequently be released from its fastening. For this purpose, the full spool is stopped and replaced by an empty spool, which serves in the further process as a replacement spool.

According to the invention, a method for making up a plurality of synchronously produced individual optical fibers with the device described above is also provided, the fibers being coated with size and bundled and passed via deflecting devices to the take-up winder.

To achieve the object according to the invention, it is proposed that the compensating device is used to compensate for differences in speed of the fiber bundle between the drawing installation and the take-up winder.

This is achieved by compensation for changes in the take-up rate of the fiber bundle on the take-up spool being provided by the speed controller, through the use of the data provided by the angular resolver, by changing the rotational speed of the take-up spool and/or by transmitting to the speed controller a signal for stopping the take-up winder corresponding to the neutral position of the dancing arm. This makes it possible for the speed controller always to adapt the rotational speed of the take-up spool to the drawing rate. In addition, it is possible for the take-up winder to stop automatically when the fiber bundle stops or breaks and the dancing arm travels into the neutral position, in that a corresponding neutral-position signal, by which the end of the taking-up operation is initialized, is sent to the speed controller. Only once the fiber bundle has been set up again and the dancing arm is again drawn out of the neutral position by the fiber bundle is it possible to control the rotational speed of the take-up spool in a way corresponding to the drawing rate.

It is also provided according to the invention that, to produce a constant tensile stress, the individual fibers are passed from the drawing installation in band form over at least one sizing roller. The individual fibers in this case lie spaced apart next one another on the sizing roller. The sizing roller is located partly in a reservoir with sizing agent, the sizing agent uniformly wetting the surface of the roller. The sizing agent is then uniformly transferred from the surface of the roller onto the fibers in contact with it.

In this case, it is provided that the individual fibers are drawn all together, with the same drawing rate in each case, through the use of the drawing-off roller and passed via a secondary roller in a bundled manner to the take-up winder. In the same way as during the sizing, the fibers are in this case passed in band form over the drawing-off roller. The downstream secondary roller ensures that the fibers are as far as possible in contact over the entire circumference on the surface of the drawing-off roller, in order that a transfer of the tensile force can take place optimally and uniformly.

After the secondary roller, the fibers are turned into a bundle. It is subsequently provided according to the invention that the fiber bundle is taken up by the take-up winder in dependence on the drawing rate of the drawing-off roller. The speed of the take-up winder consequently follows the speed of the drawing-off roller.

It is also provided that the fiber bundle is wound up on the take-up spool layer by layer, preferably with an adjustable offset per layer, through the use of the fiber guiding unit via the guiding roller. According to the invention, this is achieved by the offset being fixed by the adjustable ratio of the number of excursions of the fiber guide to the rotational speed of the take-up winder.

The offset advantageously achieves the effect that a desired wound pattern is produced on the take-up spool. This makes it possible for the unwinding of the fiber bundle from the spool to be performed unproblematically during the following further processing.

This is achieved by the fiber guide with the guiding roller being made to travel cyclically back and forth parallel to the longitudinal axis of the spool through the use of a controllable excursion mechanism for the precise laying of the fibers over the take-up spool. In this case it is provided that the winding width of the fiber layers on the take-up spool is symmetrically shortened in dependence on the total number of layers by reducing the excursion of the fiber guide on both sides.

In order to achieve optimal precision winding, it is provided that, to ensure a constant distance between the guiding roller and the uppermost layer of the take-up spool, the fiber guide with the guiding roller is made to travel continuously radially with respect to the axis of rotation of the take-up spool through the use of a controllable excursion mechanism.

In this case it is provided that the fiber guiding unit is continuously adapted to the changing wound-up radius, in dependence on the total number of layers on the take-up spool.

According to another mode of the method according to the invention, for the exchange of the take-up spool, a replacement spool is placed next to the take-up spool on the spool axis. In this case, the fiber bundle can be passed linearly from the full spool to the empty replacement spool in a simple way.

This is achieved by the fiber guiding unit being moved over the replacement spool, preferably through the use of a traveling table, when the spool is changed. This change is preferably performed with an excursion in the direction of the replacement spool.

Alternatively, this effect can also be achieved by the replacement spool being moved under the fiber guiding unit with simultaneous displacement of the take-up spool when the spool is changed. In the case of this form of spool change, it is not necessary to move the fiber guiding unit on a traveling table.

According to another feature of the invention, the drawing installation is configured to bring the optical fibers together and to form a fiber bundle from the optical fibers.

According to yet another feature of the invention, the take-up winder has a fiber guiding unit configured to continuously lay the fiber bundle on the take-up spool.

According to a further feature of the invention, the fiber guiding unit has at least one controllable excursion mechanism and a fiber guide with a guiding roller for laying the fiber bundle over the take-up spool, and the at least one controllable excursion mechanism acts on the fiber guide.

According to another feature of the invention, the take-up winder has a layer-compensating device configured to adapt the fiber guiding unit to a change in a wound-up radius on the take-up spool and/or a change in a winding width for layers of the optical fibers on the take-up spool.

According to yet another feature of the invention, the layer-compensating device has at least one controllable excursion mechanism for controlling a traveling displacement of the fiber guide and/or the guiding roller, and the at least one controllable excursion mechanism controls the traveling displacement in dependence on a number of layers of the optical fibers on the take-up spool such that the traveling displacement is controlled in a direction substantially parallel to an axis of rotation of the take-up spool and/or a direction substantially radial with respect to the axis of rotation of the take-up spool.

According to another feature of the invention, the compensating device has a speed-change compensating device for compensating a change in speed of the fiber bundle wound in layers onto the take-up spool, the speed-change compensating device is configured to compensate a change in speed of the fiber bundle when changing from one of the layers to another one of the layers and/or a change in speed of the fiber bundle resulting from a changing wound-up radius of different ones of the layers on the take-up spool.

According to a further feature of the invention, the speed-change compensating device has a dancing arm fastened at a mounting point; a deflection roller for guiding the fiber bundle is rotatably fastened to the dancing arm such that the deflection roller is held on one side of the dancing arm and such that the deflection roller is pivotable about the mounting point of the dancing arm in a plane substantially parallel to a plane of rotation of the take-up spool.

According to another feature of the invention, the deflection roller and the take-up spool have respective axes of rotation substantially parallel to one another.

According to yet another feature of the invention, the deflection roller is held on the dancing arm such that the deflection roller, in addition to performing a pivoting movement about the mounting point of the dancing arm, can oscillate with respect to the pivoting movement.

According to another feature of the invention, the dancing arm is an elastic arm including an elastic material with a given modulus of elasticity such that the deflection roller fastened thereto has a given oscillating capability.

According to another feature of the invention, the dancing arm is a plastic arm.

According to a further feature of the invention, the dancing arm has a given material thickness and/or a given shape such that the deflection roller fastened thereto has a given oscillating capability.

According to another feature of the invention, the dancing arm is assigned to an angular resolver at the mounting point; a speed controller is operatively connected to the angular resolver, and the angular resolver transmits data on angles of rotation to the speed controller for controlling a take-up rate of the take-up spool.

According to yet another feature of the invention, a central data processing unit is operatively connected to the compensating device and/or the layer-compensating device, and the central data processing unit controls the compensating device for compensating for differences in speeds and/or the layer-compensating device for adapting the fiber guiding unit.

According to another feature of the invention, the dancing arm has an equilibrium position and is configured to be acted upon by a compensating force such that the dancing arm is adjustable to the equilibrium position by the compensating force when drawing the optical fibers and taking up the fiber bundle on the take-up spool.

According to yet a further feature of the invention, the dancing arm has a neutral position and is configured to be acted upon by a compensating force such that the dancing arm is adjustable to the neutral position by the compensating force in case of an interruption or abnormal termination of the drawing and the taking up of the plurality of optical fibers.

According to a further feature of the invention, a pneumatic cylinder or a hydraulic cylinder is operatively connected to the dancing arm for providing the compensating force.

According to another feature of the invention, the dancing arm is configured to set a tension in the fiber bundle.

According to yet another feature of the invention, an adjustable pneumatic cylinder or an adjustable hydraulic cylinder is operatively connected to the dancing arm for setting the tension in the fiber bundle.

According to yet another feature of the invention, the take-up spool is fastened as an exchangeable take-up spool.

According to another feature of the invention, the take-up spool has a spool axis and is an exchangeable take-up spool to be exchanged when full, and a replacement spool is placed adjacent to the take-up spool in a direction of the spool axis and is moved under the fiber guiding unit for laying the fiber bundle on the replacement spool.

According to yet another feature of the invention, the take-up spool has a spool axis and is an exchangeable take-up spool to be exchanged when full, a replacement spool is placed adjacent to the take-up spool in a direction of the spool axis, and the fiber guiding unit travels over the replacement spool for laying the fiber bundle on the replacement spool.

According to yet a further feature of the invention, a central data processing unit is operatively connected to the compensating device; the take-up spool has a spool axis and is configured as an exchangeable take-up spool to be exchanged when full; a replacement spool is placed adjacent to the take-up spool in a direction of the spool axis such that, when the take-up spool is full, the fiber bundle changes from the take-up spool to the replacement spool; and the central data processing unit controls, via the compensating device, a rotational speed of the replacement spool by a closed-loop control and/or an open-loop control when the fiber bundle changes from the take-up spool to the replacement spool.

According to yet another feature of the invention, the drawing installation synchronously produces a plurality of individual multicomponent optical fibers.

With the objects of the invention in view there is also provided, a method for making up a plurality of optical fibers, the method including the steps of:

synchronously producing, with a drawing installation, a plurality of individual optical fibers by drawing the optical fibers with a drawing rate substantially constant and identical for each of the optical fibers;

coating the optical fibers with size;

bundling the optical fibers to form a fiber bundle;

passing the fiber bundle, via deflecting devices, to a take-up winder; and compensating, with a compensating device, for differences in speed of the fiber bundle between the drawing installation and the take-up winder.

In other words, according to the invention, there is provided a method for making up a plurality of synchronously produced individual optical fibers with a device according to the invention wherein the fibers are coated with size, bundled and passed via deflecting devices to the take-up winder, and wherein the compensating device is used to compensate for differences in speed of the fiber bundle between the drawing installation and the take-up winder.

Another mode of the method according to the invention includes guiding the fiber bundle over a deflection roller of a dancing arm, and compensating, with a speed controller, for changes in a take-up rate of the fiber bundle on a take-up spool by using data provided by an angular resolver assigned to the dancing arm and changing a rotational speed of the take-up spool.

Another mode of the method according to the invention includes guiding the fiber bundle over a deflection roller of a dancing arm, and transmitting, to a speed controller, a signal corresponding to a neutral position of the dancing arm in order to stop the take-up winder.

Yet another mode of the method according to the invention includes passing the individual optical fibers as a band over at least one sizing roller of the drawing installation in order to provide a constant tensile stress.

Another mode of the method according to the invention includes drawing the individual optical fibers all together, with a same drawing rate in each case, by using a drawing-off roller, and passing, via a secondary roller, the optical fibers as a fiber bundle to the take-up winder.

Another mode of the method according to the invention includes winding, via a guiding roller, the fiber bundle layer by layer on a take-up spool of the take-up winder by using a fiber guiding unit for displacing the fiber bundle on the take-up spool.

Yet another mode of the method according to the invention includes winding the fiber bundle on the take-up spool with an adjustable offset per layer.

Another mode of the method according to the invention includes setting the adjustable offset based on an adjustable ratio of a number of excursions of a fiber guide of the fiber guiding unit to a rotational speed of the take-up winder.

Another mode of the method according to the invention includes providing a fiber guiding unit having a controllable excursion mechanism and a fiber guide with a guiding roller, and laying the optical fibers in a precise manner over a take-up spool of the take-up winder by using the controllable excursion mechanism and moving the fiber guide with the guiding roller cyclically back and forth parallel to a longitudinal axis of the take-up spool.

A further mode of the method according to the invention includes symmetrically shortening a winding width of fiber layers on the take-up spool in dependence on a total number of fiber layers by reducing an excursion of the fiber guide on both sides of the take-up spool.

Another mode of the method according to the invention includes ensuring a substantially constant distance between a guiding roller of a fiber guide and an uppermost layer on a take-up spool by moving, with a controllable excursion mechanism, the fiber guide with the guiding roller continuously radially with respect to an axis of rotation of the take-up spool.

A further mode of the method according to the invention includes continuously adapting a fiber guiding unit including the fiber guide and the controllable excursion mechanism to a wound-up radius changing in dependence on a total number of layers on the take-up spool.

Yet a further mode of the method according to the invention includes exchanging a full take-up spool with a replacement spool by placing the replacement spool adjacent to the full take-up spool in a direction along a spool axis of the full take-up spool.

Another mode of the method according to the invention includes moving a fiber guiding unit over the replacement spool when exchanging the full take-up spool.

Another mode of the method according to the invention includes using a traveling table for moving the fiber guiding unit over the replacement spool when exchanging the full take-up spool.

Another mode of the method according to the invention includes moving the replacement spool under a fiber guiding unit and simultaneously displacing the full take-up spool when exchanging the full take-up spool.

Other features which are considered as characteristic for the invention are set forth in the appended claims.

Although the invention is illustrated and described herein as embodied in a device and a method for making up optical fibers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a diagrammatic view of the device according to the invention.

DESCRIPTION OF THE PREFERRED EMBODIMENTS

Referring now to the single FIGURE, there is shown a device 1 according to the invention for making up or assembling a plurality of synchronously produced individual optical fibers 2 from a drawing installation 3 with a take-up winder 4 and a compensating device 5.

The drawing installation 3 includes a drawing-off roller 6. The drawing-off roller 6 is preceded by a sizing installation 7, which passes the fibers 2 through sizing baths 9 through the use of sizing rollers 8. During the sizing, the fibers 2, which lie next to one another in the shape of a band on the sizing roller 8, are wetted with a sizing agent and passed to the drawing-off roller 6. On the drawing-off roller 6, the fibers 2 are taken up in the form of a band or ribbon and are drawn with a predetermined drawing rate. Through the use of a secondary roller 10, the fibers 2 are guided around the drawing-off roller 6, so that all the fibers 2 can be drawn uniformly. The drawing-off roller 6 thus prescribes the advancement or feed with which the fibers 2 must be further processed.

From the secondary roller 10, the fibers 2 are passed in a bundled manner via deflection rollers 11 and via the compensating device 5 to the take-up winder 4. The compensating device 5 includes devices for compensating for the changing speed of the fiber bundle 2. These devices include a deflection roller 13 fastened on a dancing arm 12. The dancing arm 12 is pivotably fastened at one end at a mounting point 14. The dancing arm 12 is made of an elastic material and consequently ensures the oscillating capability of the deflection roller 13 relative to the pivoting movement about the mounting point 14.

For returning the dancing arm 12 into a position of equilibrium, the dancing arm 12 has an associated compensating force, which acts counter to the pivoting movement of the dancing arm 12. For this purpose, the dancing arm 12 is acted upon by a pneumatic or hydraulic cylinder 15 with a force F which prescribes a tension in the fiber bundle 2. The force F can preferably be set at the cylinder 15.

The fiber bundle 2 is passed via further deflection rollers 16 to the take-up winder 4, where it is wound up on a take-up spool 17. For precise winding-up, the take-up spool 17 is preceded by a fiber guiding unit 19, which is disposed on a traveling table 18 and has a fiber guide 20 and a guiding roller 21.

The fiber bundle 2 arriving from the compensating device 5 is taken up by the guiding roller 21 and laid over the take-up spool 17. For this purpose, the guiding roller 21 is fastened on the fiber guide 20, which displaces the guiding roller 21 back and forth in the direction of the longitudinal axis of the take-up spool 17 through the use of an excursion mechanism 22.

In order that the distance between the uppermost layer on the take-up spool 17 and the guiding roller 21 remains constant, the fiber guide 20 is movable radially with respect to the axis of rotation of the take-up spool 17 and is moved away from the axis of the take-up spool 17 through the use of a further excursion mechanism 24 in a way corresponding to the number of layers already laid.

Before a spool change, which is performed when a take-up spool 17.1 is full, a replacement spool 17.2 is placed next to the full take-up spool 17.1. The fiber guide 20 is moved in an electrically controlled manner through the use of the excursion mechanism 22 by the traveling displacement h over the replacement spool 17.2. After that, the full take-up spool 17.1 can be removed and replaced by the empty spool body of the replacement spool 17.2. The spool change following after that is performed in the reverse sequence.

The driven components of the drawing and sizing installations 3, 7 and of the fiber guiding unit 19 and also the take-up spool 17 are driven by servo motors 23 and are controlled through the use of an electronic data processing unit.

If differences in speed occur between the advancement of the fibers 2 on the drawing-off roller 6 and the fiber bundle 2 when winding up onto the take-up spool 17, for example on account of the increasing wound radius, during a change of layer on the take-up spool 17 or during the spool change, the deflecting displacement of the fiber bundle 2 is reduced or increased in a corresponding way by the compensating device 5. This adaptation is performed through the use of the movement of the deflection roller 13. For this purpose, the dancing arm 12 may be pivoted at the mounting point 14. These changes in speed are transmitted via an angular resolver or rotational angle detector to an electronic speed controller, which correspondingly changes the take-up rate of the take-up spool 17. The angular resolver and/or the speed controller may be operatively connected to a central data processing unit. Acted on by the compensating force F, the dancing arm 12 is then made to travel into its position of equilibrium again.

The oscillating capability of the deflection roller 13 in relation to the pivoting movement of the dancing arm 12 compensates for short-term differences in speed. These differences in speed occur substantially during the change of layers at the turning points of the layers, when the laying advancement is of course briefly reduced.

Differences in speed also occur system-inherently when the spool is changed, if the fiber guiding unit 19 is made to travel at its own traveling speed over an empty take-up spool 17. These differences in speed are also corrected by the compensating device 5.

It is consequently possible by the measures according to the invention of the compensating device 5 to group the fibers together into fiber bundles 2 and make them up or assemble them on take-up rollers 17 without disturbing influences reacting on the production process. During the winding-up, looping of individual fibers in the fiber bundle 2 is avoided virtually completely, as a result of which fiber bundles 2 of high optical quality can be produced.

The adaptation of the take-up rate to the drawing rate of the drawing-off roller 6, the adjustability of the ratio of the number of excursions of the fiber guide 20 to the rotational speed of the take-up winder 4 and the compensation for differences in position at the fiber guiding unit 19 permit precision winding, which includes both a circumferential offset of the individual layers and a continuous symmetrical reduction of the winding width, so that any problems or instances of destruction are also avoided during the further processing, transport, storage and later unwinding of the full take-up spools 17.

We claim:

1. A device for making up a plurality of optical fibers, comprising:

a multifiber drawing machine having a drawing installation and a take-up winder;

said drawing installation being configured to synchronously produce a plurality of individual optical fibers, and said drawing installation being configured to provide a drawing rate for drawing the plurality of individual optical fibers such that the drawing rate is substantially constant and substantially identical for each of the optical fibers;

said take-up winder having a take-up spool and a compensating device;
said take-up spool taking up the optical fibers;
said compensating device being configured such that, when the optical fibers have respective different speeds at said drawing installation and at said take-up spool, said compensating device compensates for differences in speed between said drawing installation and said take-up spool;
said compensating device having a speed-change compensating device for compensating a change in speed of a fiber bundle wound in layers onto said take-up spool, said speed-change compensating device configured to compensate a change in speed in at least one situation selected from the group consisting of a change in speed of the fiber bundle when changing from one of the layers to another one of the layers and a change in speed of the fiber bundle resulting from a changing radius of the layers wound-up on said take-up spool;
said speed-change compensating device having a dancing arm fastened at a mounting point;
said speed-change compensating device having a deflection roller for guiding the fiber bundle;
said deflection roller rotatably fastened to said dancing arm such that said deflection roller is held on one side of said dancing arm and such that said deflection roller is pivotable about the mounting point of said dancing arm in a plane substantially parallel to a plane of rotation of said take-up spool; and
said deflection roller held on said dancing arm such that said deflection roller, in addition to performing a pivoting movement about the mounting point of said dancing arm, can oscillate separately with respect to the pivoting movement;
wherein said dancing arm is an elastic arm including an elastic material with a given modulus of elasticity such that said deflection roller fastened thereto has a given oscillating capability.

2. The device according to claim 1, wherein said dancing arm is a plastic arm.

* * * * *